United States Patent
Jiang

(10) Patent No.: US 12,556,619 B2
(45) Date of Patent: Feb. 17, 2026

(54) METHOD FOR BALANCING PRODUCTION AND CONSUMPTION OF ENERGY OF ENERGY STORAGE DEVICE AND ELECTRONIC DEVICE

(71) Applicant: Zhejiang Jinko Energy Storage Co., Ltd., Haining (CN)

(72) Inventor: Junjie Jiang, Haining (CN)

(73) Assignee: Zhejiang Jinko Energy Storage Co., Ltd., Haining (CN)

( * ) Notice: Subject to any disclaimer, the term of this patent is extended or adjusted under 35 U.S.C. 154(b) by 0 days.

(21) Appl. No.: 18/955,960

(22) Filed: Nov. 21, 2024

(65) Prior Publication Data

US 2025/0088570 A1   Mar. 13, 2025

(30) Foreign Application Priority Data

Nov. 5, 2024   (CN) .......................... 202411577483.1

(51) Int. Cl.
*H04L 67/562*    (2022.01)
*H04L 41/0833*   (2022.01)
*H04L 67/55*     (2022.01)

(52) U.S. Cl.
CPC ........ *H04L 67/562* (2022.05); *H04L 41/0833* (2013.01); *H04L 67/55* (2022.05)

(58) Field of Classification Search
CPC ....... H04L 67/55; H04L 67/306; H04L 67/02; H04L 67/10; H04L 67/562; H04L 67/12;
(Continued)

(56) References Cited

U.S. PATENT DOCUMENTS 8,099,198 B2 * 1/2012 Gurin ...................... B60L 58/12
                                                  903/903
8,427,108 B2 * 4/2013 Swenson ................... H02J 7/34
                                                  320/128
(Continued)

FOREIGN PATENT DOCUMENTS

CN    112527534 A    3/2021
CN    112667414 A    4/2021
(Continued)

OTHER PUBLICATIONS

Zhilong Yang, "Business development and network construction from the perspective of telecommunication resource utilization", Communications Today, No. 17, May 15, 2006, 2 pgs.
(Continued)

*Primary Examiner* — Ninos Donabed
(74) *Attorney, Agent, or Firm* — USCH Law, PC

(57) ABSTRACT

A method for balancing production and consumption of an energy storage device and an electronic device are provided. When a production and/or consumption variation coefficient is greater than a corresponding threshold, a target data amount A of the production messages consumed by a cloud is acquired, an accumulation rate D is calculated according to a preset length B of a service memory queue and a data amount C of the production messages currently in the service memory queue, and/or, a consumption time E is acquired according to C and A. When D is greater than a preset rate or E is greater than a preset time, an exception notification message is pushed to an exception notification queue, so that the energy storage device determines a pushing amount of the production messages when the exception notification queue is updated, and pushes the production messages according to the pushing amount.

20 Claims, 7 Drawing Sheets

(58) Field of Classification Search
CPC ..... H04L 67/535; H04L 69/329; H04L 67/51; H04L 67/52
See application file for complete search history.

(56) References Cited

U.S. PATENT DOCUMENTS

| | | | | |
|---|---|---|---|---|
| 10,237,303 | B2* | 3/2019 | Simone, Jr. | H04L 63/20 |
| 10,334,070 | B2* | 6/2019 | Balafoutis | H04L 67/10 |
| 10,432,535 | B2* | 10/2019 | Nandy | H04L 67/56 |
| 2008/0211230 | A1* | 9/2008 | Gurin | B60W 10/30 |
| | | | | 290/2 |
| 2008/0246439 | A1* | 10/2008 | Tsui | H04L 67/51 |
| | | | | 320/137 |
| 2010/0192220 | A1* | 7/2010 | Heizmann | G06F 11/3688 |
| | | | | 717/124 |
| 2012/0043938 | A1* | 2/2012 | Swenson | H02J 7/34 |
| | | | | 320/128 |
| 2015/0196841 | A1* | 7/2015 | Lee | H04L 43/04 |
| | | | | 463/42 |
| 2016/0079778 | A1* | 3/2016 | Howe | H02J 3/32 |
| | | | | 320/167 |
| 2016/0212225 | A1* | 7/2016 | Smith | H04L 41/20 |
| 2016/0212239 | A1* | 7/2016 | Das | H04L 67/63 |
| 2016/0323143 | A1* | 11/2016 | Kim | H04L 41/0816 |
| 2016/0329710 | A1* | 11/2016 | Clifton | H02J 13/00034 |
| 2018/0115523 | A1* | 4/2018 | Subbarayan | G06N 20/00 |
| 2018/0270310 | A1* | 9/2018 | Venkatesan | H04L 12/2836 |
| 2019/0132316 | A1* | 5/2019 | Gramza | H04L 63/0876 |
| 2019/0132738 | A1* | 5/2019 | Zhang | H04W 12/088 |
| 2019/0132931 | A1* | 5/2019 | Sharma | H05B 47/1965 |
| 2020/0007488 | A1 | 1/2020 | Mao | |
| 2021/0203709 | A1* | 7/2021 | Archer | H04L 65/4061 |
| 2022/0021164 | A1* | 1/2022 | Tremelling | H01R 13/70 |
| 2022/0021210 | A1* | 1/2022 | Cairoli | H02J 13/00006 |
| 2022/0329074 | A1* | 10/2022 | Wang | H02J 3/144 |
| 2022/0357713 | A1* | 11/2022 | Wang | G06Q 10/06315 |
| 2022/0358268 | A1* | 11/2022 | Wang | G06Q 10/04 |

FOREIGN PATENT DOCUMENTS

| | | |
|---|---|---|
| CN | 114237886 A | 3/2022 |
| CN | 114637615 A | 6/2022 |
| CN | 115658342 A | 1/2023 |
| CN | 117499487 A | 2/2024 |
| CN | 118227351 A | 6/2024 |
| CN | 118413569 A | 7/2024 |

OTHER PUBLICATIONS

Feng Liu et al., "Performance Comparison and Optimization Scheme of Message Queue Based on Massive Data", Computer Engineering & Software, vol. 37, No. 10, Oct. 15, 2016, 5 pgs.

* cited by examiner

METHOD FOR BALANCING PRODUCTION AND CONSUMPTION OF ENERGY OF ENERGY STORAGE DEVICE AND ELECTRONIC DEVICE

CROSS REFERENCE TO RELATED APPLICATIONS

This application claims priority to Chinese Patent Application No. CN202411577483.1, entitled "METHOD FOR BALANCING PRODUCTION AND CONSUMPTION OF ENERGY OF ENERGY STORAGE DEVICE AND ELECTRONIC DEVICE," filed on Nov. 5, 2024, which is incorporated by reference herein in its entirety.

TECHNICAL FIELD

The various embodiments of the present disclosure relate to the technical filed of energy storage, and in particular to a method for balancing production and consumption of energy of an energy storage device and an electronic device.

BACKGROUND

At present, an energy storage device, as a producer, and a cloud, as a consumer, generally, are in communication connection with each other via a middleware, that is, a proxy server. The energy storage device pushes messages to the proxy server, and the cloud acquires messages from the proxy server. In related technologies, energy storage devices may be subjected to unstable rates of producers pushing production messages and clouds may be subjected to unstable rates of consuming production messages.

The cases that the energy storage device, acting as the producer, pushes production messages at unstable rate are as follows. The producer pushes production messages, such as battery cell data, to the proxy server (e.g. MQTT (Message Queuing Telemetry Transport) broker), however, the producer pushes the production messages at a rate of 0 while the producer generates a large number of production messages locally, when the producer is in an unstable network or directly off-network. When the energy storage device is reconnected, a large number of production messages that are not pushed locally are pushed to the proxy server (e.g. the MQTT broker). At this time, the producer pushes production messages at a rate far in excess of the original normal rate (e.g., up to 10 times of the original rate). In these cases, the following problems arise. The producer suddenly pushes a large amount of battery cell data, in the case that the consumer rate remains unchanged, resulting in that too many messages are accumulated in the proxy server (e.g. the MQTT broker), in more serious cases or even causing the proxy server (e.g. MQTT broker) to be subjected to an OOM (Out Of Memory) exception problem caused by excessive memory load.

The case that the cloud, acting as the consumer, consumes production messages at unstable rate is as follows. When the consumer consumes the production messages, such as battery cell data, the cases, such as the components associated with the cloud being blocked or the network of the cloud fluctuating, may cause the consumer to consume the production messages at a slower rate (for example, consuming at 50% of the original rate). Long-term message accumulation may lead to untimely display of data in the cloud, in more serious cases or even causing the proxy server to be subjected to an OOM exception problem caused by excessive memory load.

In the related art, when an exception of the energy storage device or the cloud leads to the OOM exception problem of the proxy server, the energy storage device is notified to stop pushing data and the cloud stops consuming data, so that the energy storage device and the cloud are restarted after the exception is repaired. However, this method is only a post-event repair of the OOM exception problem, which not only wastes the operation and maintenance resources, but also affects the operation efficiency of the whole system.

SUMMARY

The embodiments of the present disclosure are intended to provide a method for balancing production and consumption of energy of an energy storage device and an electronic device, so as to self-adaptively balance the production rate and the consumption rate when the energy storage device or the cloud is abnormal, reduce the probability of the OOM exception problem in the proxy server, reduce the waste of operation and maintenance resources, and improve the operation efficiency of the whole system.

In order to solve the above technical problems, a method for balancing production and consumption of energy of an energy storage device is provided according to the embodiments of the present disclosure, and is applied to a proxy server. The proxy server is connected with the energy storage device and a cloud, the proxy server, the energy storage device and the cloud are in communication connection based on MQTT protocol. A service memory queue and an exception notification queue are provided in the proxy server. The energy storage device pushes production messages to the service memory queue, and the cloud consumes the production messages from the service memory queue. The method includes: acquiring a production variation coefficient of the production messages pushed by the energy storage device and a consumption variation coefficient of the production messages consumed by the cloud in real time; in response to the production variation coefficient being greater than a first threshold and/or the consumption variation coefficient being greater than a second threshold, acquiring a target data amount A of the production messages consumed by the cloud in a current unit time; calculating an accumulation rate D according to a preset length B of the service memory queue and a data amount C of the production messages currently in the service memory queue, and/or, acquiring a consumption time E estimated by the cloud to consume the data amount C of the production messages currently in the service memory queue according to the data amount C and the target data amount A; in response to the accumulation rate D being greater than a preset accumulation rate or the consumption time E being greater than a preset consumption time, pushing an exception notification message to the exception notification queue, so that the energy storage device determines a pushing amount of the production messages according to a preset mode in response to monitoring that the exception notification queue is updated, and the energy storage device pushes the production messages according to the pushing amount. After the energy storage device pushes the production messages according to the pushing amount, the proxy server repeats operations of acquiring the production variation coefficient of the production messages pushed by the energy storage device and acquiring the consumption variation coefficient of the production messages consumed by the cloud until the production variation coefficient is less than or equal to the first threshold and the consumption variation coefficient is less than or equal to the second threshold, or until the accumulation rate D is less than or equal to the preset accumulation rate and/or the consumption time E is less than or equal to the preset consumption time.

A method for balancing production and consumption of an energy storage device is further provided according to the embodiments of the present disclosure, and is applied to the energy storage device. The energy storage device is connected with a proxy server, and the proxy server is connected with a cloud. The proxy server, the energy storage device and the cloud are in communication connection based on MQTT protocol, a service memory queue and an exception notification queue are provided in the proxy server, the energy storage device pushes production messages to the service memory queue, and the cloud consumes the production messages from the service memory queue. The method includes: monitoring the exception notification queue in real time; and determining a pushing amount of the production messages pushed by the energy storage device according to a preset mode in response to monitoring that the exception notification queue is updated. The proxy server pushes an exception notification message to the exception notification queue in response to an accumulation rate D being greater than a preset accumulation rate or a consumption time E being greater than a preset consumption time, and the proxy server acquires the accumulation rate D and/or the consumption time E by: acquiring, by the proxy server, a production variation coefficient of the production messages pushed by the energy storage device and a consumption variation coefficient of the production messages consumed by the cloud in real time; in response to the production variation coefficient being greater than a first threshold and/or the consumption variation coefficient being greater than a second threshold, acquiring a target data amount A of the production messages consumed by the cloud in a current unit time; calculating the accumulation rate D according to a preset length B of the service memory queue and a data amount C of the production messages currently in the service memory queue, and/or, acquiring a consumption time E estimated by the cloud to consume the data amount C of the production messages currently in the service memory queue according to the data amount C and the target data amount A; and pushing the production messages to the service memory queue according to the pushing amount. After the energy storage device pushes the production messages according to the pushing amount, the proxy server repeats operations of acquiring the production variation coefficient of the production messages pushed by the energy storage device and acquiring the consumption variation coefficient of the production messages consumed by the cloud until the production variation coefficient is less than or equal to the first threshold and the consumption variation coefficient is less than or equal to the second threshold, or until the accumulation rate D is less than or equal to the preset accumulation rate and/or the consumption time E is less than or equal to the preset consumption time.

An electronic device is provided according to the embodiments of the present disclosure, and includes: at least one processor; and, a memory, in communication connection with the at least one processor. The memory stores instructions executable by the at least one processor, and the instructions, when executed by the at least one processor, cause the at least one processor to implement the above-mentioned method for balancing production and consumption of the energy storage device.

In some embodiments, the proxy server is provided with a first sliding window computing component and a rolling window computing component. In response to the production variation coefficient being greater than the first threshold and/or the consumption variation coefficient being greater than the second threshold, acquiring the target data amount A of the production messages consumed by the cloud in the current unit time includes: in response to the production variation coefficient being greater than the first threshold, acquiring, by the rolling window computing component, the target data amount A of the production messages consumed by the cloud in the current unit time; in response to the consumption variation coefficient being greater than the second threshold, acquiring, by the first sliding window computing component, a first data amount of the production messages consumed by the cloud per unit time within a first preset time range before a current moment, and averaging a plurality of first data amounts to obtain a first average data amount. The first average data amount is the target data amount A of the production messages consumed by the cloud in the current unit time.

In some embodiments, the proxy server is provided with a second sliding window computing component. In response to the production variation coefficient being greater than the first threshold and/or the consumption variation coefficient being greater than the second threshold, acquiring the target data amount A of the production messages consumed by the cloud in the current unit time includes: in response to the production variation coefficient being greater than the first threshold and/or the consumption variation coefficient being greater than the second threshold, acquiring, by the second sliding window computing component, a first data amount of the production messages consumed by the cloud per unit time within a first preset time range before a current moment, and averaging a plurality of first data amounts to obtain a first average data amount. The first average data amount is the target data amount A of the production messages consumed by the cloud in the current unit time.

In some embodiments, acquiring the production variation coefficient of the production messages pushed by the energy storage device includes: acquiring a second data amount of the production messages pushed by the energy storage device per unit time within a second preset time range before a current moment, averaging a plurality of second data amounts to obtain a second average data amount, taking variance for the plurality of second data amounts to obtain a first standard deviation, and calculating the production variation coefficient according to the second average data amount and the first standard deviation.

In some embodiments, acquiring the consumption variation coefficient of the production messages consumed by the cloud includes: acquiring a third data amount of the production messages consumed by the cloud per unit time within a third preset time range before a current moment, averaging a plurality of third data amounts to obtain a third average data amount, taking variance for the plurality of third data amounts to obtain a second standard deviation; and calculating the consumption variation coefficient according to the third average data amount and the second standard deviation.

The technical solution provided by the embodiment of the present disclosure at least has the advantages as follows.

The production variation coefficient and the consumption variation coefficient are acquired by the proxy server, and the target data amount A consumed by the cloud in the current unit time is acquired in response to one of the production variation coefficient and the consumption variation coefficient being greater than the corresponding threshold value. The preset length B of the service memory queue and the data amount C of the production messages currently in the service memory queue, as the attribute information of the queue, can be directly acquired. Then, the accumulation rate D and/or the consumption time E are calculated according to the target data amount A, the preset length B and the data amount C. If the accumulation rate D is greater than the preset accumulation rate or the consumption time E is greater than the preset consumption time, an exception is determined, and the exception notification message is pushed to the exception notification queue. The pushing amount is determined according to the preset mode when the energy storage device monitors that the exception notification queue updates the exception notification message, so as to continuously circulate to obtain a balanced state, realize the self-adaptive balance of the production rate and the consumption rate, avoid the OOM exception of the proxy server, reduce the waste of operation and maintenance resources, and improve the operation efficiency of the whole system.

BRIEF DESCRIPTION OF THE DRAWINGS

One or more embodiments are exemplified by figures in the accompanying drawings, which do not constitute a limitation to the embodiments, and elements in the drawings having the same reference numerals are represented as similar elements, unless specifically stated, the figures in the drawings do not constitute a proportion limitation.

DETAILED DESCRIPTION OF THE EMBODIMENTS

Figure 1:
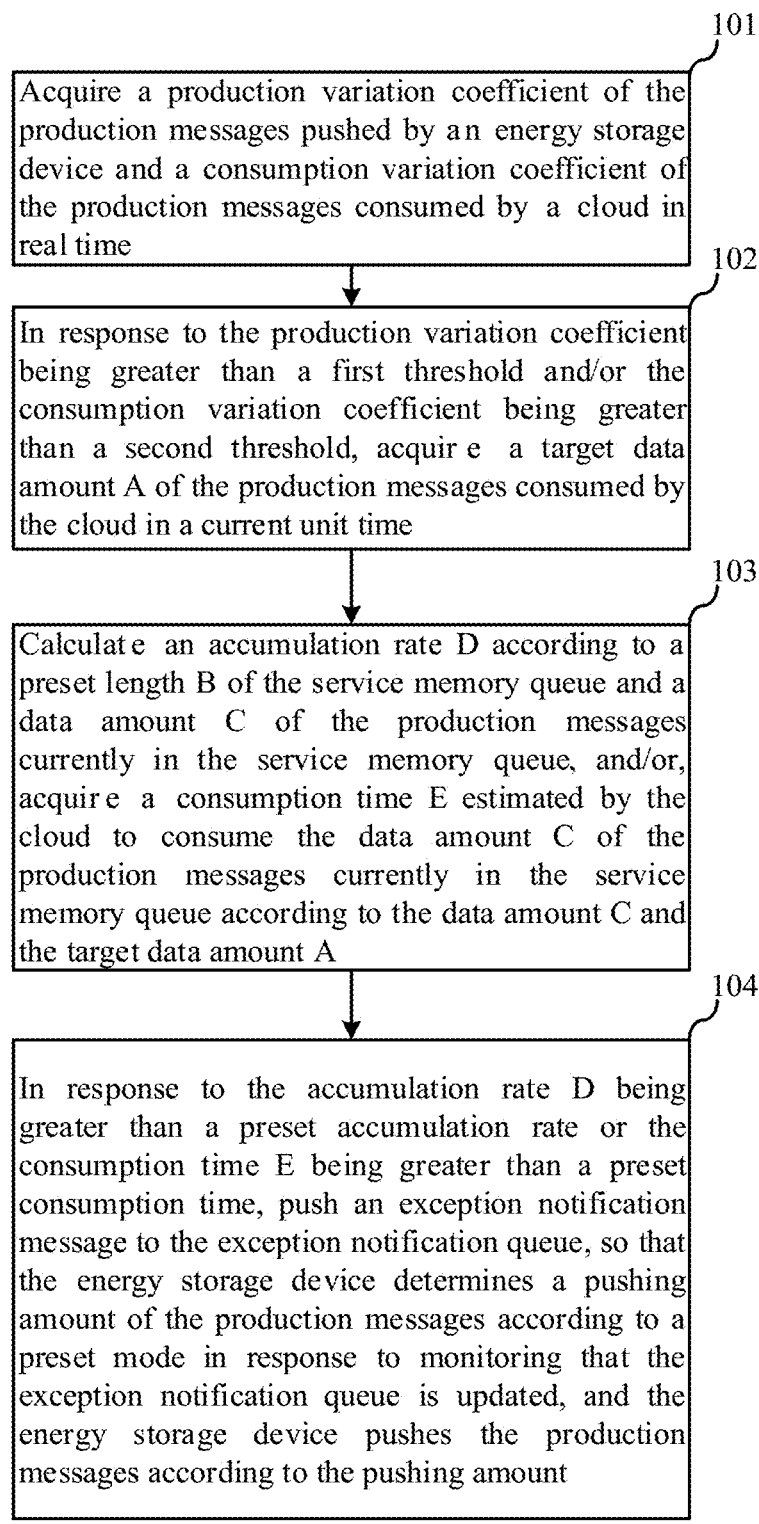
FIG. 1 is a flowchart of a method for balancing production and consumption of an energy storage device according to an embodiment of the present disclosure.

It can be seen from BACKGROUND that when the energy storage device is in an unstable network or off-network, the messages produced by the energy storage device may be accumulated in the energy storage device locally, and after the energy storage device is connected to the network normally, a large amount of data accumulated locally is pushed to the proxy server. If the consumption rate of the cloud remains unchanged, the memory load of the proxy server is excessively large, and an OOM (Out Of Memory) exception problem occurs. When the components associated with the cloud are blocked or the network of the cloud fluctuates, the energy storage device keeps pushing messages to the proxy server all the time. Long-term message accumulation leads to the excessive memory load of the proxy server and the OOM exception problem.

As can be seen, exceptions encountered by either the producer or the consumer may lead to the OOM exception problem in the proxy server. When an exception of the energy storage device or the cloud leads to the OOM exception problem of the proxy server, the energy storage device is notified to stop pushing data and the cloud stops consuming data, so that the energy storage device and the cloud are restarted after the exception is repaired. However, this method is only a post-event repair of the OOM exception problem, which not only wastes the operation and maintenance resources, but also affects the operation efficiency of the whole system.

Therefore, in the embodiments, a production variation coefficient and a consumption variation coefficient are acquired by the proxy server. In a case that one of the production variation coefficient and the consumption variation coefficient is greater than a corresponding threshold, a target data amount A consumed by the cloud in the current unit time is acquired. After that, an accumulation rate D and/or a consumption time E are calculated based on the target data amount A, a preset length B of a service memory queue, and a data amount C of the production messages currently in the service memory queue. If the accumulation rate D and/or the consumption time E is abnormal, an exception notification message is pushed to an exception notification queue, and a pushing amount of the energy storage device is determined according to a preset mode in response to monitoring that the exception notification message in the exception notification queue is updated, so as to continuously circulate to obtain a balance state, thereby realizing the self-adaptive balance of the production rate and consumption rate, avoiding the OOM exception of the proxy server, reducing the waste of operation and maintenance resources, and improving the operation efficiency of the whole system.

In order to make the purpose, technical solution and advantages of the embodiments of the present disclosure more clear, the embodiments of the present disclosure will be described in detail in combination with the attached drawings. However, those skilled in the art should understand that in various embodiments of the present disclosure, many technical details are put forward so as to make readers better understand the present disclosure. However, even without these technical details and various changes and modifications based on the following embodiments, the technical solution claimed in the present disclosure can be realized. The following embodiments are divided for the convenience of description, and should not constitute any limitation on the specific implementation of the present disclosure. The embodiments can be combined with each other and cited without contradiction.

A method for balancing production and consumption of an energy storage device is provided according to an embodiment of the present disclosure, and is applied to a proxy server. The flowchart of the method for balancing production and consumption of the energy storage device is shown in FIG. 1, which includes the following operations.

At operation 101, a production variation coefficient of the production messages pushed by the energy storage device and a consumption variation coefficient of the production messages consumed by the cloud are acquired in real time.

Figure 2:
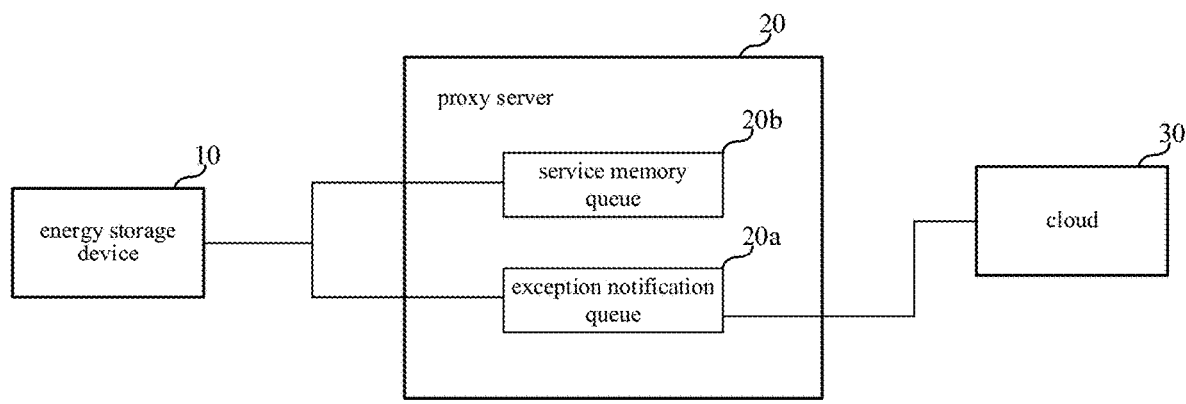
FIG. 2 is a schematic structural diagram of a system for balancing production and consumption according to an embodiment of this application.

Specifically, the executive body of this embodiment is the proxy server, which is connected with the energy storage device and the cloud. The proxy server, the energy storage device and the cloud together form a system for balancing production and consumption, as shown in FIG. 2, which is the schematic structural diagram of the system for balancing production and consumption corresponding to this embodiment. The system for balancing production and consumption includes the energy storage device 10, the proxy server 20 and the cloud 30. The proxy server 20, the energy storage device 10 and the cloud 30 are in communication connection based on MQTT (Message Queuing Telemetry Transport) protocol. A service memory queue 20a and an exception notification queue 20b are provided in the proxy server. The energy storage device 10 pushes the production messages to the service memory queue 20a, and the cloud consumes the production messages from the service memory queue 20a.

In this embodiment, the energy storage device is a producer, and the cloud is a consumer. The energy storage device 10, the proxy server 20 and the cloud 30 are in communication based on MQTT protocol, which is a message publishing/subscribing transmission protocol based on client-server, and has the characteristics of light weight, simplicity, openness and easy implementation. In practical application, the energy storage device 10, as a producer, constantly pushes the production messages to the service memory queue 20a of the proxy server 20, and the cloud 30, as a consumer, continuously consumes the production messages from the service memory queue 20a, and the production messages after consumption by the cloud 30 are removed from the service memory queue 20a.

At operation 102, in response to the production variation coefficient being greater than a first threshold and/or the consumption variation coefficient being greater than a second threshold, a target data amount A of the production messages consumed by the cloud in a current unit time is acquired.

Specifically, under normal circumstances, there is little difference between the rate of pushing the production messages by the producer and the rate of consuming the production message by the consumer, and a good balance can be achieved. In this case, the producer pushes the production messages at a stable rate, that is, the production variation coefficient is less than or equal to the first threshold, and the consumer consumes the production messages at a stable rate, that is, the consumption variation coefficient is less than or equal to the second threshold. However, when the producer is abnormal, the rate of pushing the production messages by the producer is unstable, that is, the production variation coefficient is greater than the first threshold. When the consumer is abnormal, the rate of consuming the production messages by the consumer is unstable, that is, the consumption variation coefficient is greater than the second threshold. When either the producer or the consumer is abnormal, the target data amount A of the production messages consumed by the cloud in the current unit time is acquired.

Specifically, the specific implementation mode of acquiring the production variation coefficient of the production messages pushed by the energy storage device is as follows: acquiring, by the proxy server, a second data amount of the production messages pushed by the energy storage device per unit time within a second preset time range before a current moment, averaging a plurality of second data amounts to obtain a second average data amount, taking variance for the plurality of second data amounts to obtain a first standard deviation, and calculating the production variation coefficient according to the second average data amount and the first standard deviation.

In practical application, the second preset time range can be 1 minute, each unit time is 1 second, the second average data amount is the average value of the production messages pushed by the producer per second in 1 minute before the current moment (denoted as $\mu 1$), the first standard deviation is the standard deviation of the production messages pushed by the producer per second in 1 minute before the current moment (denoted as $\sigma 1$), the production variation coefficient CV1 (CV1=$\sigma 1/\mu 1$) can be calculated, and the first threshold is set to 20%. If CV1 is greater than 20%, it means that the fluctuation of the producer is too large, then go to operation 102. If CV1 is less than or equal to 20%, it means that the production variation coefficient is normal at this time.

Specifically, the specific implementation mode of acquiring the consumption variation coefficient of the production messages consumed by the cloud is as follows: acquiring, by the proxy server, a third data amount of the production messages consumed by the cloud per unit time within a third preset time range before a current moment, averaging a plurality of third data amounts to obtain a third average data amount, taking variance for the plurality of third data amounts to obtain a second standard deviation, and calculating the consumption variation coefficient according to the third average data amount and the second standard deviation.

In practical application, the third preset time range can be 1 minute, each unit time is 1 second, the third average data amount is the average value of the production messages consumed by the consumer per second in the minute before the current moment (denoted as $\mu 2$), the second standard deviation is the standard deviation of the production messages pushed by the consumer per second in the minute before the current moment (denoted as $\sigma 2$), the consumption variation coefficient CV2 (CV2=$\sigma 2/\mu 2$) can be calculated, and the second threshold is set to 20%. If CV2 is greater than 20%, it means that the fluctuation of the consumer is too large, then go to operation 102. If CV2 is less than or equal to 20%, it means that the consumption variation coefficient is normal at this time. The third preset time range can be the same as or different from the second preset time range, and the first threshold can be the same as or different from the second threshold, which is set according to actual demand, which is not limited in this embodiment.

It should be noted that a list of data amounts of production and consumption is provided in the proxy server, which records the data amount of the production messages pushed by the producer per unit time, such as per second, and the data amount of the production messages consumed by the consumer per unit time, such as per second. According to the list, the data amount of the production messages pushed by the energy storage device per unit time and the data amount of the production messages consumed by the cloud per unit time can be acquired, so as to calculate the production variation coefficient and the consumption variation coefficient.

At operation 103: an accumulation rate D is calculated according to a preset length B of the service memory queue and a data amount C of the production messages currently in the service memory queue, and/or, a consumption time E estimated by the cloud to consume the data amount C of the production messages currently in the service memory queue is acquired according to the data amount C and the target data amount A.

Specifically, the preset length B of the service memory queue and the data amount C of the production messages currently in the service memory queue are the attribute information of the queue, which can be directly acquired by the proxy server for calculating the accumulation rate D and the consumption time E. The accumulation rate D meets: D=C/B, the consumption time E meets: E=C/A, and the consumption time E indicates how many seconds it will take to consume all the production messages in the service memory queue.

At operation 104, in response to the accumulation rate D being greater than a preset accumulation rate or the consumption time E being greater than a preset consumption time, an exception notification message is pushed to the exception notification queue, so that the energy storage device determines a pushing amount of the production messages according to a preset mode in response to monitoring that the exception notification queue is updated, and the energy storage device pushes the production messages according to the pushing amount.

Specifically, in this embodiment, only one of the accumulation rate D and the consumption time E may be calculated, or both the accumulation rate D and the consumption time E may be calculated. In the case of only calculating the accumulation rate D, it is only necessary to determine whether the calculated accumulation rate D meets the demand, that is, the accumulation rate D is less than or equal to the preset accumulation rate. If the accumulation rate D is greater than the preset accumulation rate, it is determined that an exception occurs. In a case of only calculating the consumption time E, it is only necessary to determine that the consumption time E meets the demand, that is, the consumption time E is less than or equal to the preset consumption time. If the consumption time E is greater than the preset consumption time, it is determined that an exception occurs. In a case of calculating both the calculated accumulation rate D and the consumption time E, it is necessary to determine whether the accumulation rate D and the consumption time E meet the preset conditions simultaneously. If one of the accumulation rate D and the consumption time E does not meet the conditions, that is, if the accumulation rate D is greater than the preset accumulation rate or the consumption time E is greater than the preset consumption time, it is determined that an exception occurs.

Specifically, after the energy storage device pushes the production messages according to the pushing amount, the proxy server repeats operations of acquiring the production variation coefficient of the production messages pushed by the energy storage device and acquiring the consumption variation coefficient of the production messages consumed by the cloud, that is, circularly executes operations 101 to 104 until the production variation coefficient is less than or equal to the first threshold and the consumption variation coefficient is less than or equal to the second threshold, or until the accumulation rate D is less than or equal to the preset accumulation rate and/or the consumption time E is less than or equal to the preset consumption time, that is, a new balanced state is reached at this time.

It should be noted that whether only one of the accumulation rate D and the consumption time E is calculated, or both the accumulation rate D and the consumption time E are calculated, the new balanced state includes the case that the production variation coefficient is less than or equal to the first threshold and the consumption variation coefficient is less than or equal to the second threshold. In the case of only calculating the accumulation rate D, the new balanced state includes the case that the accumulation rate D is less than or equal to the preset accumulation rate. In the case of only calculating the consumption time E, the new balanced state includes the case that the consumption time E is less than or equal to the preset consumption time. In the case of calculating both the accumulation rate D and the consumption time E, the new balanced state includes the case that the accumulation rate D is less than or equal to the preset accumulation rate and the consumption time E is less than or equal to the preset consumption time.

It should be noted that when the new balanced state is reached, other situations may occur, which may lead to the production variation coefficient and the consumption variation coefficient not meeting the requirements. Therefore, the proxy server needs to monitor the production variation coefficient and the consumption variation coefficient in real time to balance the production and consumption of the energy storage device.

Specifically, in response to the accumulation rate D being greater than the preset accumulation rate or the consumption time E being greater than the preset consumption time, an exception notification message is pushed to the exception notification queue. The exception notification message may include the target data amount A calculated by the proxy server in this round, the preset length B of the service memory queue, the data amount C of the production messages currently in the service memory queue, the accumulation rates D and the consumption time E, which are set according to the actual demand, so that the energy storage device can determine the pushing amount of the production messages pushed by the energy storage device according to a preset mode in response to monitoring that the exception notification queue is updated. The preset mode may be to determine the current pushing amount of the production messages pushed by the energy storage device according to a preset reduction coefficient and the target data amount A. The preset reduction coefficient is a positive number less than 1, which may be set according to actual demand, such as 0.8, 0.7 and 0.6.

It should be noted that the first threshold and the second threshold may be set according to actual demand, for example, the first threshold is set to 30% and the second threshold is set to 10. In a case that the accumulation rate D is greater than 30% or the consumption time E is greater than 10, an exception is triggered, and the proxy server pushes the exception notification message to the exception notification queue.

In this embodiment, the production variation coefficient and the consumption variation coefficient are acquired by the proxy server. In the case that one of the production variation coefficient and the consumption variation coefficient is greater than the corresponding threshold, the target data amount A consumed by the cloud in the current unit time is acquired. Moreover, the preset length B of the service memory queue and the data amount C of the production messages currently in the service memory queue, as the attribute information of the queue, can be directly acquired. Then, the accumulation rate D and/or the consumption time E are calculated according to the target data amount A, the preset length B and the data amount C. If the accumulation rate D is greater than the preset accumulation rate or the consumption time E is greater than the preset consumption time, it is determined that an exception occurs, and the exception notification message is pushed to the exception notification queue. The energy storage device determines the pushing amount according to the preset mode in response to monitoring that the exception notification message in the exception notification queue is updated, so as to continuously circulate to obtain a balanced state, realize the self-adaptive balance of the production rate and the consumption rate, avoid the OOM exception of the proxy server, reduce the operation and maintenance resources and improve the operation efficiency of the whole system.

In practical application, the energy storage device in this embodiment may be a battery cell device, and the corresponding production messages is battery cell data generated by the battery cell device. The battery cell device, the proxy server and the cloud are in communication based on MQTT protocol. The battery cell device continuously generates battery cell data during the working process, and pushes the battery cell data to the proxy server (e.g. MQTT broker) when networking, specifically to the service memory queue in the proxy server (e.g. MQTT broker). The cloud acquires the battery cell data from the service memory queue in the proxy server (e.g. MQTT broker), and the battery cell data acquired by the cloud will be moved out of the service memory queue. After acquiring the battery cell data, the cloud displays the battery cell data in the background. When the production variation coefficient of the battery cell device and the consumption variation coefficient of the cloud are abnormal, the target data amount A of the battery cell data consumed by the cloud in the current unit time is acquired, then the accumulation rate D of the battery cell data is calculated according to the preset length B of the service memory queue and the data amount C of the battery cell data currently in the service memory queue, and the consumption time E estimated by the cloud to consume the data amount C of the battery cell data currently in the service memory queue is acquired according to the data amount C and the target data amount A. In response to the accumulation rate D being greater than the preset accumulation rate or the consumption time E being greater than the preset consumption time, the exception notification message is pushed to the exception notification queue in the proxy server (e.g. MQTT broker). In response to monitoring that the exception notification queue is updated, the battery cell device determines the pushing amount of the battery cell data pushed by the battery cell device according to the preset mode, and the battery cell device pushes the battery cell data to the proxy server according to the pushing amount.

In other embodiments, the energy storage device may also be a battery stack, and the corresponding production messages is battery stack data, which includes the overall current, voltage, System On Chip (SOC) and other data of the battery stack, and the battery stack pushes the battery stack data to the service memory queue in the proxy server (e.g. MQTT broker). The energy storage device may also be a battery cluster, and the corresponding production messages is battery cluster data, which includes the overall current, voltage, SOC and other data of the battery cluster, and the battery cluster pushes the battery cluster data to the service memory queue in the proxy server (e.g. MQTT broker).

Figure 3:
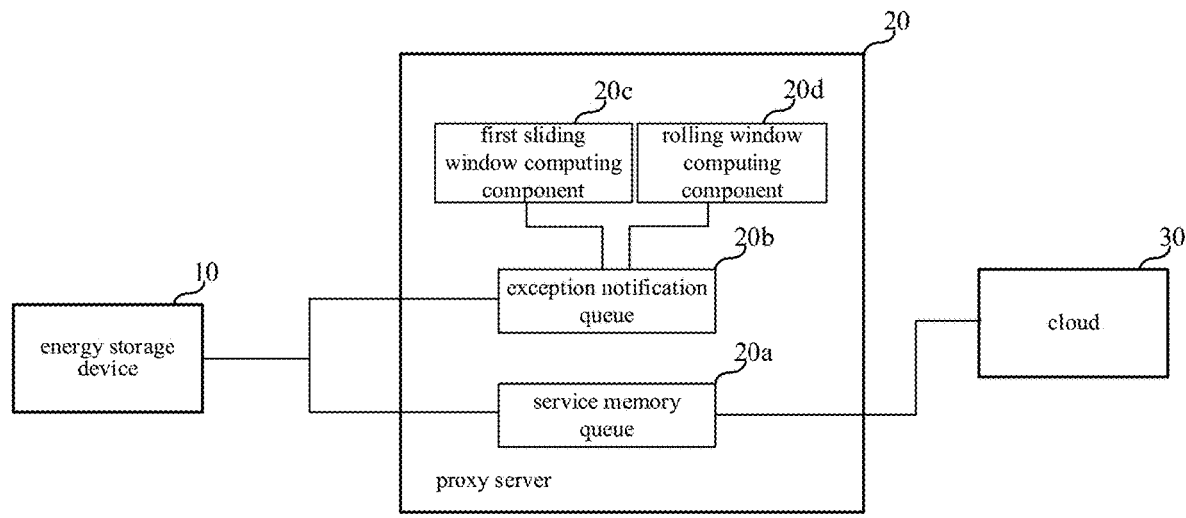
FIG. 3 is a schematic structural diagram of a system for balancing production and consumption according to another embodiment of the present application.

A method for balancing production and consumption of an energy storage device is provided according to another embodiment of the present disclosure, and is applied to a proxy server. The proxy server is provided with a first sliding window computing component and a rolling window computing component, as shown in FIG. 3, which is a structural schematic diagram of a system for balancing production and consumption corresponding to this embodiment, and the system for balancing production and consumption includes an energy storage device 10, a proxy server 20 and a cloud 30. The proxy server 20, the energy storage device 10 and the cloud 30 are in communication connection based on MQTT protocol. A service memory queue 20a and an exception notification queue 20b are provided in the proxy server, and the proxy server 20 is provided with a first sliding window computing component 20c and a rolling window computing component 20d. The energy storage device 10 pushes the production messages to the service memory queue 20a, and the cloud consumes the production messages from the service memory queue 20a.

Figure 4:
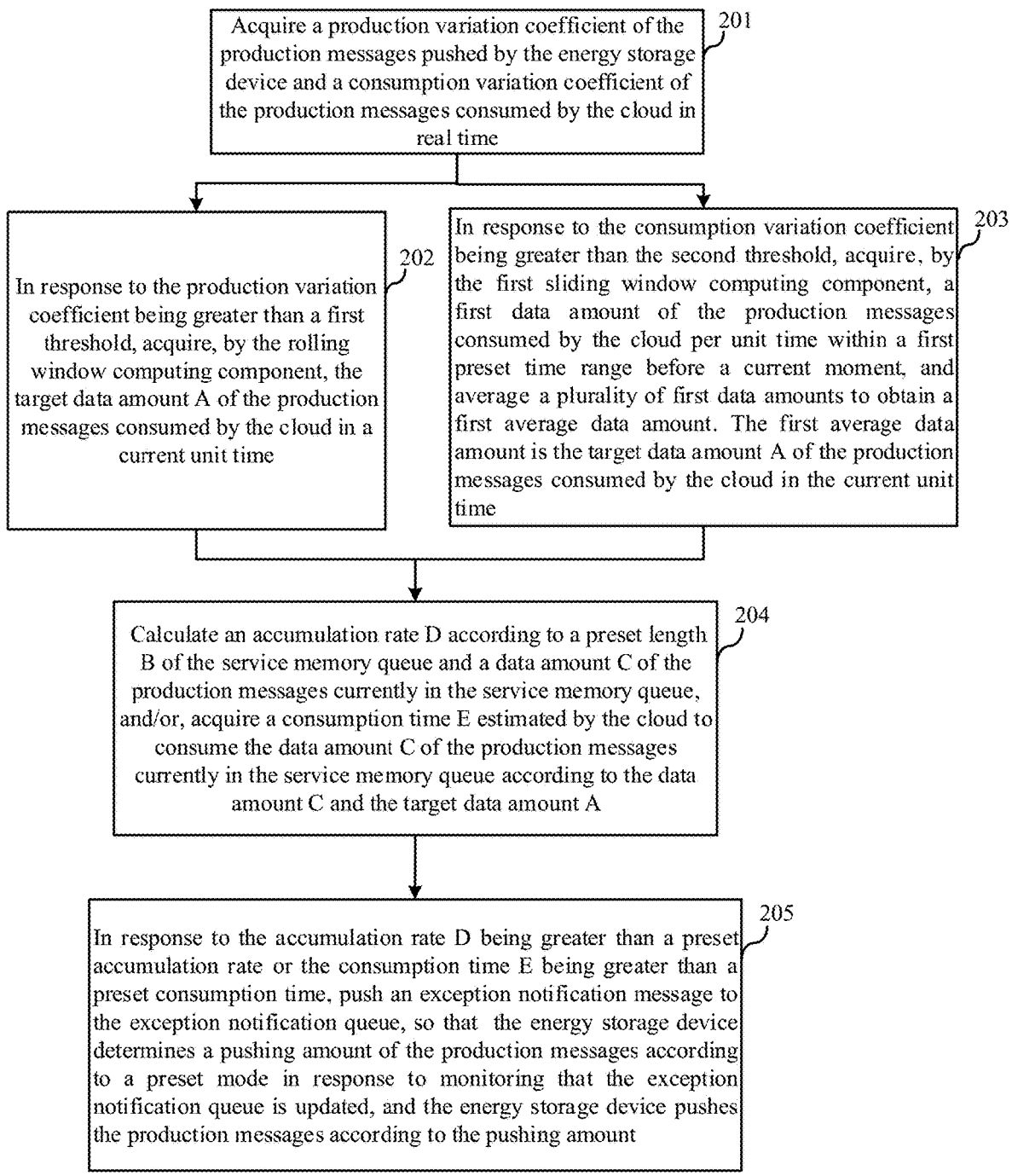
FIG. 4 is a flowchart of a method for balancing production and consumption of an energy storage device according to another embodiment of the present disclosure.

The flowchart of the method for balancing production and consumption of the energy storage device is shown in FIG. 4, which includes the following operations.

At operation 201: a production variation coefficient of the production messages pushed by the energy storage device and a consumption variation coefficient of the production messages consumed by the cloud are acquired in real time.

Operation 202 and operation 203 are specific implementations of operation 102 in the previous embodiment. Operation 202 and operation 203 are as follows.

At operation 202, in response to the production variation coefficient being greater than the first threshold, the rolling window computing component acquires the target data amount A of the production messages consumed by the cloud in the current unit time.

Specifically, a list of production and consumption data amounts is provided in the proxy server, which records the data amount of the production messages pushed by the producer per unit time, such as per second, and the data amount of the production messages consumed by the consumer per unit time, such as per second. In practical application, the data amount of the production messages consumed by the consumer per unit time, such as per second, can be recorded in the list in chronological order. In this embodiment, the unit time can be set to 1 second, and the rolling window computing component is configured to monitor the data amount A of the consumption messages of the consumer every 1 second in real time.

At operation 203, in response to the consumption variation coefficient being greater than the second threshold, the first sliding window computing component acquires a first data amount of the production messages consumed by the cloud per unit time within a first preset time range before a current moment, and averages a plurality of first data amounts to obtain a first average data amount. The first average data amount is the target data amount A of the production messages consumed by the cloud in the current unit time.

Figure 5:
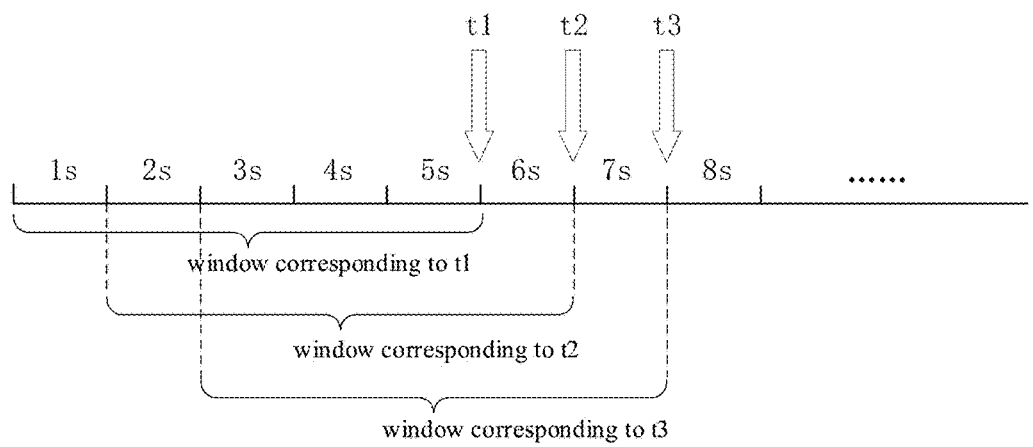
FIG. 5 is a schematic diagram of a window of a first sliding window computing component sliding with time according to an embodiment of the present disclosure.

Specifically, a list of production and consumption data amounts is provided in the proxy server. In practical application, the data amount of the production messages consumed by the consumer per unit time, such as per second, can be recorded in the list in chronological order. A window size of the first sliding window computing component is the first preset time range, and an end point of the window of the first sliding window computing component is the current moment, so the window of the first sliding window computing component slides with time. As shown in FIG. 5, it is a schematic diagram of the window of the first sliding window computing component sliding with time. In the figure, the first preset time range is 5 seconds, that is, the window size of the first sliding window computing component is 5 seconds and the unit time is 1 second. At time t1, the window of the first sliding window computing component corresponds to 1 s to 5 s, at time t2, the window of the first sliding window computing component corresponds to 2 s to 6 s, and at time t3, the window of the first sliding window computing component corresponds to 3 s to 7 s, and so on. After the first sliding window computing component determines the first data amount of the production messages consumed by the cloud every second in the window for 5 seconds according to the current moment, the first average data amount is acquired by averaging the plurality of first data amounts, that is, the target data amount A is acquired.

At operation 204, an accumulation rate D is calculated according to a preset length B of the service memory queue and a data amount C of the production messages currently in the service memory queue, and/or, a consumption time E estimated by the cloud to consume the data amount C of the production messages currently in the service memory queue is acquired according to the data amount C and the target data amount A.

At operation 205, in response to the accumulation rate D being greater than a preset accumulation rate or the consumption time E being greater than a preset consumption time, an exception notification message is pushed to the exception notification queue, so that the energy storage device determines a pushing amount of the production messages pushed by the energy storage device according to a preset mode in response to monitoring that the exception notification queue is updated, and the energy storage device pushes the production messages according to the pushing amount.

The above operations 201, 204, and 205 are substantially the same as the operations 101, 103, and 104 of the previous embodiment, and are not repeated here to avoid repetition.

In this embodiment, by setting the first sliding window computing component and the rolling window computing component, when the consumption variation coefficient is greater than the second threshold, it means that the consumption rate of the cloud, that is, the consumer, is unstable, and there will be fluctuations in the consumption rate. If the rolling window computing component is used to calculate, the acquired rate of the consumer may be at the peak or trough, resulting in inaccurate data of the acquired target data amount A. Therefore, in this embodiment, when the consumption variation coefficient is greater than the second threshold, the first data amount of the production messages consumed by the cloud per unit time within the first preset time range before the current moment is acquired by the first sliding window computing component, and the plurality of first data amounts are averaged to obtain the first average data amount. The first average data amount is the target data amount A of the production messages consumed by the cloud in the current unit time, so as to ensure the accuracy of the acquired target data amount A when the rate of the consumers is unstable. At the same time, when the production variation coefficient is greater than the first threshold, the target data amount A of the production messages currently consumed by the cloud per unit time is acquired by the rolling window computing component, which can alleviate the computing pressure of each window computing component.

It should be noted that when one of the production variation coefficient and the consumption variation coefficient is abnormal, the target data amount A can be acquired according to the corresponding rolling window computing component and the first sliding window computing component. When both the production variation coefficient and the consumption variation coefficient are abnormal, that is, when the production variation coefficient is greater than the first threshold and the consumption variation coefficient is greater than the second threshold, the target data amount A can be acquired only by the first sliding window computing component, thus ensuring the accuracy of the acquired target data amount A. Specifically, whether the consumption variation coefficient is greater than the second threshold can be determined first. In the case that the consumption variation coefficient is greater than the second threshold, the target data amount A can be acquired directly by the first sliding window computing component, without comparing the production variation coefficient with the first threshold. In the case that the consumption variation coefficient is less than or equal to the second threshold, whether the production variation coefficient is greater than the first threshold is then determined. The target data amount A can be acquired by the rolling window computing component if it is determined that the production variation coefficient is greater than the first threshold.

Figure 6:
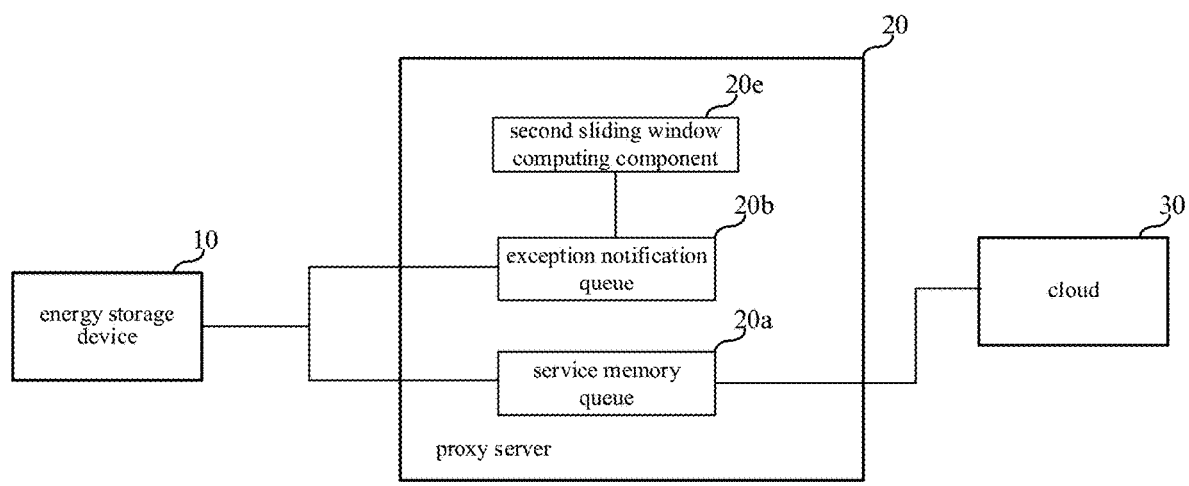
FIG. 6 is a structural diagram of a system for balancing production and consumption according to a further embodiment of the present disclosure.

A method for balancing production and consumption of an energy storage device is provided according to a further embodiment of the present disclosure, and is applied to a proxy server. The proxy server is provided with a second sliding window computing component, as shown in FIG. 6, which is a structural schematic diagram of a system for balancing production and consumption corresponding to this embodiment, and the system for balancing production and consumption includes an energy storage device 10, a proxy server 20 and a cloud 30. The proxy server 20, the energy storage device 10 and the cloud 30 are in communication connection based on MQTT protocol. A service memory queue 20a and an exception notification queue 20b are provided in the proxy server, and the proxy server 20 is provided with a second sliding window computing component 20c. The energy storage device 10 pushes the production messages to the service memory queue 20a, and the cloud consumes the production messages from the service memory queue 20a.

Figure 7:
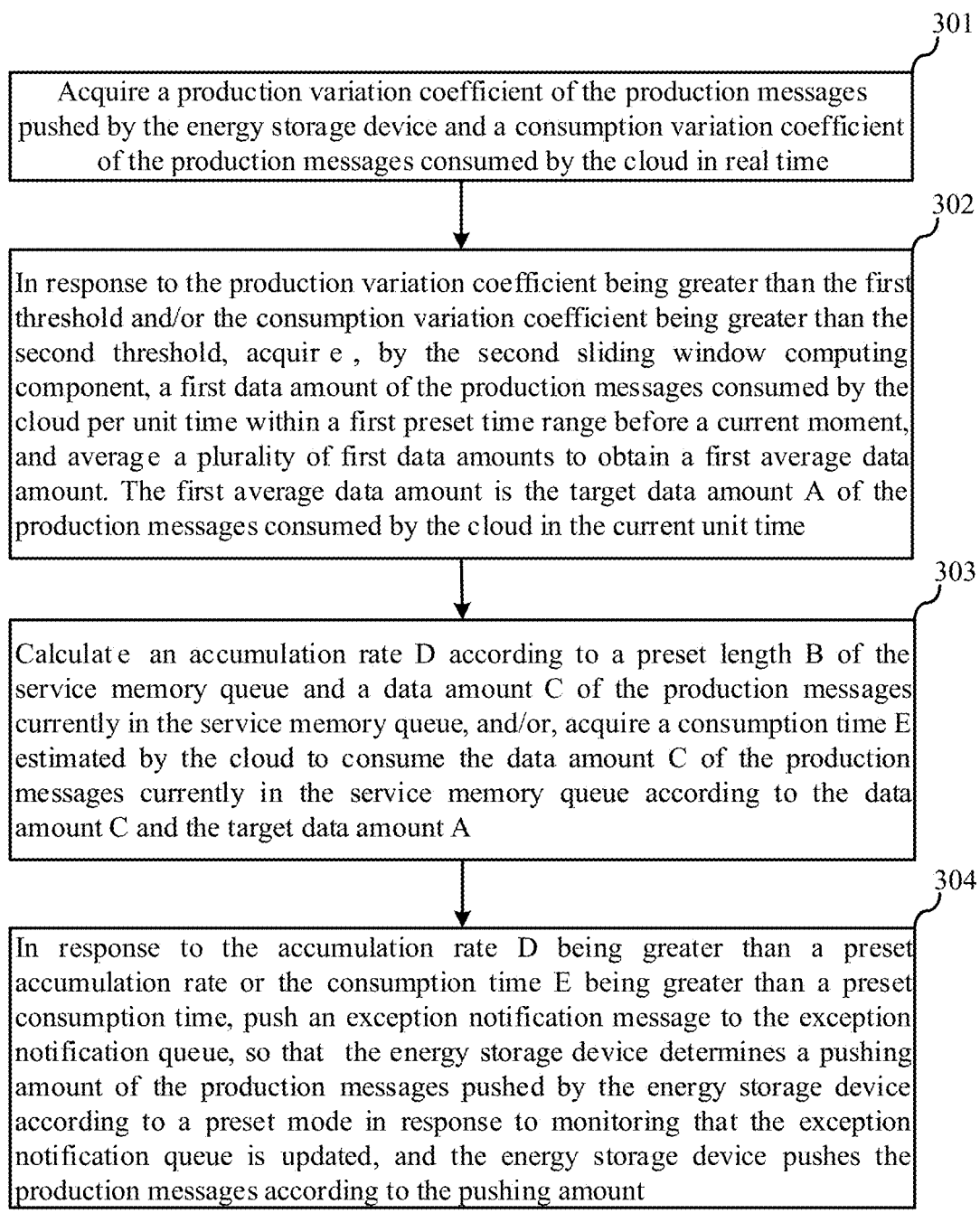
FIG. 7 is a flowchart of a method for balancing production and consumption balance method of an energy storage device according to a further embodiment of the present disclosure.

The flowchart of the method for balancing production and consumption of the energy storage device in this embodiment is shown in FIG. 7, which includes the following operations.

At operation 301, a production variation coefficient of the production messages pushed by the energy storage device and a consumption variation coefficient of the production messages consumed by the cloud are acquired in real time.

Operation 302 is a specific implementation of operation 102 in the previous embodiment. Operation 302 is as follows.

At operation 302, in response to the production variation coefficient being greater than the first threshold and/or the consumption variation coefficient being greater than the second threshold, the second sliding window computing component acquires a first data amount of the production messages consumed by the cloud per unit time within a first preset time range before a current moment, and averages a plurality of first data amounts to obtain a first average data amount. The first average data amount is the target data amount A of the production messages consumed by the cloud in the current unit time.

Specifically, a list of data amounts of production and consumption is provided in the proxy server, which records the data amount of the production messages pushed by the producer per unit time, such as per second, and the data amount of the production messages consumed by the consumer per unit time, such as per second. In practical application, the data amount of the production messages consumed by the consumer per unit time, such as per second, can be recorded in the list in chronological order. A window size of the second sliding window computing component is the second preset time range, and an end point of the window of the second sliding window computing component is the current moment, so the window of the second sliding window computing component slides with time. The implementation principle of the second sliding window computing component is similar to that of the first sliding window computing component, which is not repeated herein to avoid repetition.

At operation 303, an accumulation rate D is calculated according to a preset length B of the service memory queue and a data amount C of the production messages currently in the service memory queue, and/or, a consumption time E estimated by the cloud to consume the data amount C of the production messages currently in the service memory queue is acquired according to the data amount C and the target data amount A.

At operation 304, in response to the accumulation rate D being greater than a preset accumulation rate or the consumption time E being greater than a preset consumption time, an exception notification message is pushed to the exception notification queue, so that the energy storage device determines a pushing amount of the production messages pushed by the energy storage device according to a preset mode in response to monitoring that the exception notification queue is updated, and the energy storage device pushes the production messages according to the pushing amount.

The above operations 301, 303 and 304 are substantially the same as the operations 101, 103 and 104 of the previous embodiment, and are not repeated here to avoid repetition.

In this embodiment, by setting the second sliding window computing component, when the consumption variation coefficient is greater than the second threshold, it means that the consumption rate of the cloud, that is, the consumer, is unstable, and there will be fluctuations in the consumption rate. If the rolling window computing component is used to calculate, the acquired rate of the consumer may be at the peak or trough, resulting in inaccurate data of the acquired target data amount A. Therefore, in this embodiment, when the consumption variation coefficient is greater than the second threshold, the first data amount of the production messages consumed by the cloud per unit time within the first preset time range before the current moment is acquired by the second sliding window computing component, and the plurality of first data amounts are averaged to obtain the first average data amount. The first average data amount is the target data amount A of production messages consumed by the cloud in the current unit time, so as to ensure the accuracy of the acquired target data amount A when the rate of the consumer is unstable. At the same time, when the production variation coefficient is greater than the first threshold, the target data amount A of the production messages currently consumed by the cloud per unit time is also acquired by the second sliding window computing component, which also ensures the accuracy of the acquired target data amount A when the rate of the producer is unstable, and reduces the investment cost of the proxy server by only providing one window computing component.

A method for balancing production and consumption of an energy storage device is provided according to another embodiment, and is applied to the energy storage device. As shown in FIG. 2, which is a structural schematic diagram of a system for balancing production and consumption corresponding to this embodiment, the system for balancing production and consumption includes an energy storage device 10, a proxy server 20 and a cloud 30. The proxy server 20, the energy storage device 10 and the cloud 30 are in communication connection based on MQTT protocol. A service memory queue 20a and an exception notification queue 20b are provided in the proxy server. The energy storage device 10 pushes the production messages to the service memory queue 20a, and the cloud consumes the production messages from the service memory queue 20a.

Figure 8:
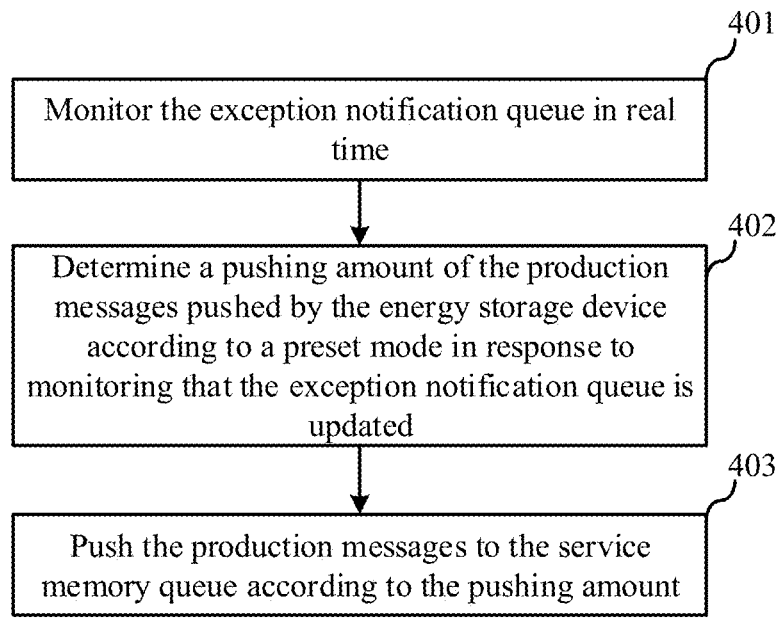
FIG. 8 is a flowchart of a method for balancing production and consumption balance method of an energy storage device according to still another embodiment of the present disclosure.

The flowchart of the method for balancing production and consumption of the energy storage device in this embodiment is shown in FIG. 8, which includes the following operations.

At operation 401, the exception notification queue is monitored in real time.

At operation 402, a pushing amount of the production messages pushed by the energy storage device is determined according to a preset mode in response to monitoring that the exception notification queue is updated.

The proxy server pushes the exception notification message to the exception notification queue in response to the accumulation rate D being greater than the preset accumulation rate or the consumption time E being greater than the preset consumption time, and the proxy server acquires the accumulation rate D and/or the consumption time E by: acquiring, by the proxy server, a production variation coefficient of the production messages pushed by the energy storage device and a consumption variation coefficient of the production messages consumed by the cloud in real time, in response to the production variation coefficient being greater than a first threshold and/or the consumption variation coefficient being greater than a second threshold, acquiring a target data amount A of the production messages consumed by the cloud in a current unit time, calculating the accumulation rate D according to a preset length B of the service memory queue and a data amount C of the production messages currently in the service memory queue, and/or acquiring a consumption time E estimated by the cloud to consume estimated the data amount C of the production messages currently in the service memory queue according to the data amount C and the target data amount A.

At operation 403, the production messages are pushed to the service memory queue according to the pushing amount.

After the energy storage device pushes the production messages according to the pushing amount, the proxy server repeats operations of acquiring the production variation coefficient of the production messages pushed by the energy storage device and acquiring the consumption variation coefficient of the production messages consumed by the cloud until the production variation coefficient is less than or equal to the first threshold and the consumption variation coefficient is less than or equal to the second threshold, or until the accumulation rate D is less than or equal to the preset accumulation rate and/or the consumption time E is less than or equal to the preset consumption time.

The energy storage device monitors whether the exception notification queue is updated in real time, and pushes the production messages to the service memory queue according to the pushing amount in response to monitoring that the exception notification queue is updated, so as to automatically adjust the pushing amount of the energy storage device, thereby continuously circulating to obtain a balanced state, realizing the self-adaptive balance of the production rate and the consumption rate, avoiding the OOM exception of the proxy server, reducing the operation and maintenance resources and improving the operation efficiency of the whole system.

In practical application, the energy storage device in this embodiment may be a battery cell device, and the corresponding production messages is battery cell data generated by the battery cell device. The battery cell device, the proxy server and the cloud are in communication based on MQTT protocol. The service memory queue and the exception notification queue are provided in the proxy server, and the battery cell device monitors whether the exception notification queue in the proxy server is updated in real time, and determines the pushing amount of the battery cell data pushed by the battery cell device according to a preset mode in response to monitoring that the exception notification queue is updated, and the battery cell device pushes the battery cell data to the proxy server according to the pushing amount.

In an example, after the energy storage device pushes the production messages to the service memory queue according to the pushing amount, the method further includes: in response to a total amount of the current production messages of the energy storage device being greater than the pushing amount, storing remaining production messages, exceeding the pushing amount in the current production messages, locally in the energy storage device. In this embodiment, the remaining production messages are stored locally in the energy storage device to ensure data integrity. At the same time, when the pushing amount of the energy storage device increases, the production messages stored locally in the energy storage device can be pushed out. Even if the pushed data amount is large, it can be automatically adjusted by the method for balancing production and consumption in this embodiment, so as to avoid OOM exception in the proxy server, reduce the waste of operation and maintenance resources and improve the operation efficiency of the whole system.

In practical application, after the battery cell device pushes the production messages to the service memory queue according to the pushing amount, the remaining battery cell data, exceeding the pushing amount in the current battery cell data, is locally stored in the battery cell device in response to the total amount of the current battery cell data of the battery cell device being greater than the pushing amount. The pushing amount of the battery cell data is improved by the production and consumption balance method under the condition that the consumption capacity of the cloud is improved. Therefore, by self-adaptively adjusting the pushing rate and the consumption rate between the battery cell device and the cloud, the OOM abnormality of the proxy server when the pushing rate of the battery device or the consumption rate of the cloud is unstable is avoided, the waste of operation and maintenance resources is reduced, and the operation efficiency of the whole system is improved. In one example, the exception notification message includes the corresponding target data amount A. The determining the pushing amount of the production messages pushed by the energy storage device according to the preset mode includes: determining the pushing amount of the production messages currently pushed by the energy storage device according to a preset reduction coefficient and the target data amount A. The preset reduction coefficient is a positive number less than 1. In this embodiment, the exception notification message at least includes the target data amount A calculated by the proxy server in this round, and the exception notification message may also include the accumulation rate D and the consumption time E, which are specifically set according to the actual demand, and the preset reduction coefficient is also set according to the actual demand, such as 0.8, 0.7 and 0.6. In this embodiment, when the consumer or the producer is abnormal, the current pushing amount of the production messages pushed by the energy storage device is determined by the preset reduction coefficient and the target data amount A of the production messages consumed by the cloud in the current unit time, thereby reducing the rate of the production messages pushed by the current producer, ensuring that the consumer can consume the remaining production messages in the service memory queue in sufficient time, reducing the pressure of the proxy server, avoiding the OOM exception of the proxy server, reducing the waste of the operation and maintenance resources, and improving the operation efficiency of the whole system.

In practical application, in response to monitoring that the exception notification queue is updated, the pushing amount of the battery cell data pushed by the battery cell device is determined according to the preset mode. In response to the battery cell device pushing the battery cell data to the proxy server according to the pushing amount, the battery cell device acquires the target data amount A from the updated exception notification message, and determines the current pushing amount of the battery cell data pushed by the battery cell device according to the preset reduction coefficient and the target data amount A, so as to reduce the rate of pushing the battery data by the current battery device, ensure that the cloud can consume the remaining battery data in the service memory queue in sufficient time, reduce the pressure of the proxy server, avoid the OOM exception of the proxy server, reduce the waste of operation and maintenance resources, and improve the operation efficiency of the whole system.

In other embodiments, the energy storage device may also be a battery stack, and the corresponding production messages is battery stack data, which includes the overall current, voltage, SOC and other data of the battery stack. The energy storage device may also be a battery cluster, and the corresponding production messages is battery cluster data, which includes the overall current, voltage, SOC and other data of the battery cluster.

It is not difficult to find that this embodiment is an embodiment of the method for balancing production and consumption balance on the energy storage device side corresponding to the above-mentioned method for balancing production and consumption on the proxy server side, and this embodiment can be implemented in cooperation with the embodiment on the proxy server side. The relevant technical details mentioned in the embodiment of the proxy server side are still valid in this embodiment, which are not repeated to reduce duplication, they are not repeated here. Accordingly, the related technical details mentioned in this embodiment can also be applied to the embodiment on the proxy server side.

Figure 9:
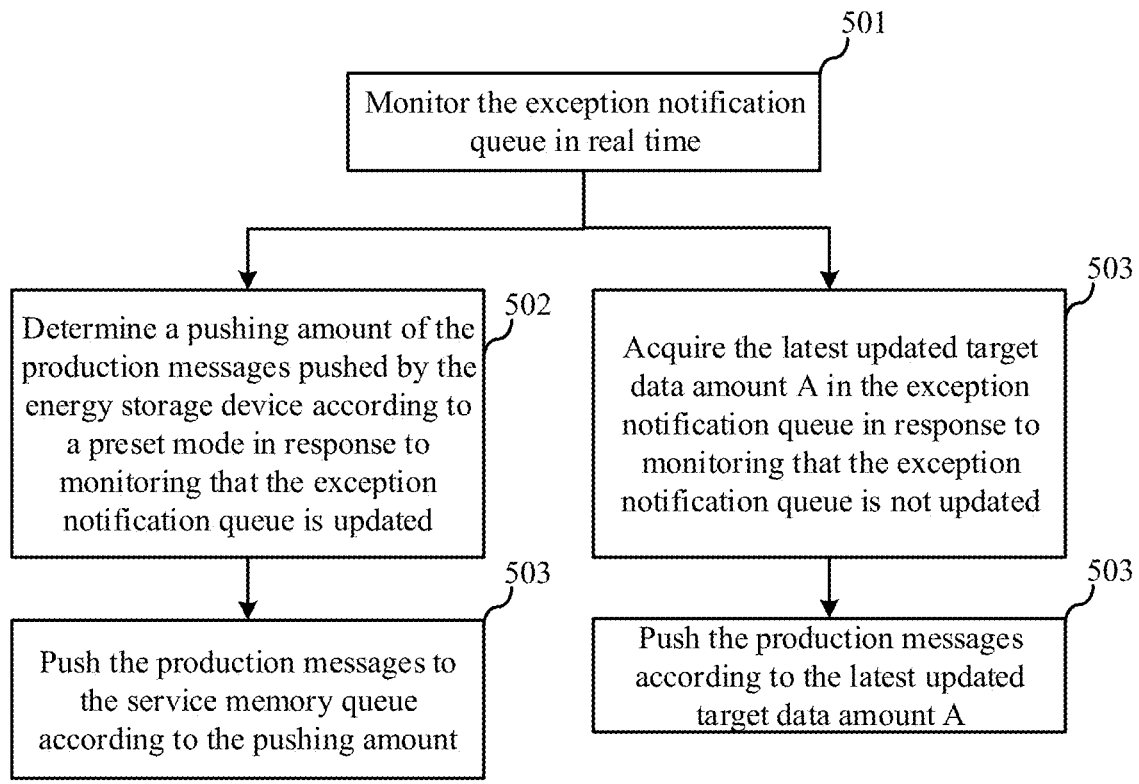
FIG. 9 is a flowchart of a method for balancing production and consumption balance method of an energy storage device according to yet another embodiment of the present disclosure.

A method for balancing production and consumption of an energy storage device is provided according to another embodiment, and is applied to the energy storage device. The flowchart of the method for balancing production and consumption of the energy storage device in this embodiment is shown in FIG. 9, which includes the following operations.

At operation 501, the exception notification queue is monitored in real time.

At operation 502, a pushing amount of the production messages pushed by the energy storage device is determined according to a preset mode in response to monitoring that the exception notification queue is updated.

At operation 503, the production messages are pushed to the service memory queue according to the pushing amount.

The above operations 501, 502 and 503 are substantially the same as the operations 401, 402 and 403 of the previous embodiment, and are not repeated here to avoid repetition.

At operation 504, the latest updated target data amount A in the exception notification queue is acquired in response to monitoring that the exception notification queue is not updated.

At operation 505, the production messages are pushed according to the latest updated target data amount A.

The exception notification message in this embodiment includes the target data amount A calculated by the proxy server in this round, in which the target data amount A calculated in this round will be put into the exception notification queue only when the proxy server sends the exception notification message to the exception notification queue. When the proxy server does not send the exception notification message to the exception notification queue in this round, it means that the current round has reached a balanced state, so the target data amount A stored in the exception notification queue in the last round is acquired, and the target data amount A is taken as the pushing amount of the energy storage device.

It should be noted that the target data amount A exists in the exception notification queue of the last round, which means that the pushing amount adjusted by the energy storage device after the last round is the product of the target data amount A of the last round and the preset reduction coefficient, and the target data amount A of the last round is used as the pushing amount of the energy storage device, so that when the current round reaches the balanced state, the pushing amount of the energy storage device is appropriately increased, which is beneficial to maintaining the balanced state while improving the efficiency of the system efficiency.

Figure 10:
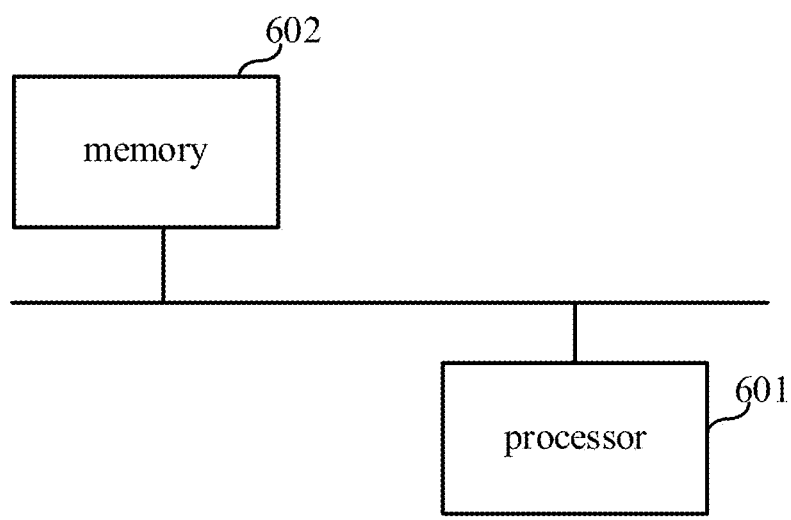
FIG. 10 is a schematic structural diagram of an electronic device according to an embodiment of the present disclosure.

An electronic device is provided according to an embodiment of the present disclosure, as shown in FIG. 10, which includes: at least one processor 601; and, a memory 602, in communication connection with the at least one processor 601. The memory 602 stores instructions executable by the at least one processor 601, and the instructions, when executed by the at least one processor 601, cause the at least one processor 601 to implement the above method.

The memory 602 and the at least one processor 601 are connected by a bus, which can include any number of interconnected buses and bridges, and the bus connects one or more processors 601 and various circuits of the memory 602 together. The bus may also connect various other circuits, such as peripheral devices, voltage regulators and power management circuits, which are well known in the art, and therefore will not be further described herein. The bus interface provides an interface between the bus and a transceiver. The transceiver may be one element or multiple elements, such as multiple receivers and transmitters, providing a unit for communicating with various other devices over a transmission medium. The data processed by the at least one processor 601 is transmitted over the wireless medium through the antenna, and further, the antenna receives the data and transmits the data to the at least one processor 601.

The at least one processor 601 is configured to manage the bus and general processing, and may also provide various functions, including timing, peripheral interface, voltage regulation, power management and other control functions. The memory 602 is configured to store data used by the at least one processor when performing operations.

It can be understood by those skilled in the art that the above-mentioned embodiments are specific embodiments for realizing the present disclosure, but in practical application, various changes can be made in form and details without departing from the spirit and scope of the present disclosure.

What is claimed is:

1. A method for balancing production and consumption of energy of an energy storage device, applied to a proxy server, wherein the proxy server is connected with the energy storage device and a cloud, the proxy server, the energy storage device and the cloud are in communication connection based on Message Queuing Telemetry Transport (MQTT) protocol, a service memory queue and an exception notification queue are provided in the proxy server, the energy storage device pushes production messages to the service memory queue, and the cloud consumes the production messages from the service memory queue, and the method comprises:

acquiring a production variation coefficient of the production messages pushed by the energy storage device and a consumption variation coefficient of the production messages consumed by the cloud in real time;

determining that at least one of a first condition and a second condition is satisfied, wherein the first condition is determined to be satisfied if the production variation coefficient is determined to be greater than a first threshold and the second condition is determined to be satisfied if the consumption variation coefficient is determined to be greater than a second threshold;

in response to the at least one of the first condition and the second condition having been satisfied, acquiring a target data amount A of the production messages consumed by the cloud in a current unit time;

performing at least one of a calculating step and an acquiring step, wherein during the calculating step, an accumulation rate D is calculated according to a preset length B of the service memory queue and a data amount C of the production messages currently in the service memory queue, and wherein, during the acquiring step, a consumption time E estimated by the cloud to consume the data amount C of the production messages currently in the service memory queue is acquired according to the data amount C and the target data amount A;

determining that at least one of a third condition and a fourth condition is satisfied, wherein the third condition is determined to be satisfied if the accumulation rate D is determined to be greater than a preset accumulation rate and the fourth condition is determined to be satisfied if the consumption time E is determined to be greater than a preset consumption time;

in response to the at least one of the third condition and the fourth condition having been satisfied, pushing an exception notification message to the exception notification queue, so that the energy storage device determines a pushing amount of the production messages according to a preset mode in response to monitoring that the exception notification queue is updated, and the energy storage device pushes the production messages according to the pushing amount;

wherein after the energy storage device pushes the production messages according to the pushing amount, the proxy server repeats operations of acquiring the production variation coefficient of the production messages pushed by the energy storage device and acquiring the consumption variation coefficient of the production messages consumed by the cloud until the first condition and the second condition are no longer satisfied, or until the at least one of the third condition and the fourth condition is no longer satisfied.

2. The method for balancing production and consumption of the energy of the energy storage device according to claim 1, wherein the proxy server is provided with a first sliding window computing component and a rolling window computing component;

the acquiring the target data amount A of the production messages consumed by the cloud in the current unit time includes:
in response to the first condition having been satisfied, acquiring, by the rolling window computing component, the target data amount A of the production messages consumed by the cloud in the current unit time;
in response to the second condition having been satisfied, acquiring, by the first sliding window computing component, a first data amount of the production messages consumed by the cloud per unit time within a first preset time range before a current moment, and averaging a plurality of first data amounts to obtain a first average data amount, wherein the first average data amount is the target data amount A of the production messages consumed by the cloud in the current unit time.

3. The method for balancing production and consumption of the energy of the energy storage device according to claim 1, wherein the proxy server is provided with a second sliding window computing component;

the acquiring the target data amount A of the production messages consumed by the cloud in the current unit time includes:
acquiring, by the second sliding window computing component, a first data amount of the production messages consumed by the cloud per unit time within a first preset time range before a current moment, and averaging a plurality of first data amounts to obtain a first average data amount, wherein the first average data amount is the target data amount A of the production messages consumed by the cloud in the current unit time.

4. The method for balancing production and consumption of the energy of the energy storage device according to claim 1, wherein the acquiring the production variation coefficient of the production messages pushed by the energy storage device includes:
acquiring a second data amount of the production messages pushed by the energy storage device per unit time within a second preset time range before a current moment;
averaging a plurality of second data amounts to obtain a second average data amount;
taking variance for the plurality of second data amounts to obtain a first standard deviation; and
calculating the production variation coefficient according to the second average data amount and the first standard deviation.

5. The method for balancing production and consumption of the energy of the energy storage device according to claim 1, wherein the acquiring the consumption variation coefficient of the production messages consumed by the cloud includes:
acquiring a third data amount of the production messages consumed by the cloud per unit time within a third preset time range before a current moment;
averaging a plurality of third data amounts to obtain a third average data amount;
taking variance for the plurality of third data amounts to obtain a second standard deviation; and
calculating the consumption variation coefficient according to the third average data amount and the second standard deviation.

6. The method for balancing production and consumption of the energy of the energy storage device according to claim 1, wherein the proxy server is provided with a list of data amounts of production and consumption, configured to record the data amount of the production messages pushed by the producer per unit time and the data amount of the production messages consumed by the consumer per unit time; the production variation coefficient and the consumption variation coefficient are acquired according to the data amount of the production messages pushed by the producer per unit time and the data amount of the production messages consumed by the consumer per unit time in the list.

7. A method for balancing production and consumption of energy of an energy storage device, applied to the energy storage device, wherein the energy storage device is connected with a proxy server, the proxy server is connected with a cloud, the proxy server, the energy storage device and the cloud are in communication connection based on Message Queuing Telemetry Transport (MQTT) protocol, a service memory queue and an exception notification queue are provided in the proxy server, the energy storage device pushes production messages to the service memory queue, and the cloud consumes the production messages from the service memory queue, and the method comprises:
monitoring the exception notification queue in real time; and
determining a pushing amount of the production messages pushed by the energy storage device according to a preset mode in response to monitoring that the exception notification queue is updated;
wherein the proxy server pushes an exception notification message to the exception notification queue in response to an accumulation rate D being greater than a preset accumulation rate or a consumption time E being greater than a preset consumption time, and the proxy server acquires at least one of the accumulation rate D and the consumption time E by:
acquiring, by the proxy server, a production variation coefficient of the production messages pushed by the energy storage device and a consumption variation coefficient of the production messages consumed by the cloud in real time;
determining that at least one of a first condition and a second condition is satisfied, wherein the first condition is determined to be satisfied if the production variation coefficient is determined to be greater than a first threshold and the second condition is determined to be satisfied if the consumption variation coefficient is determined to be greater than a second threshold;
in response to the at least one of the first condition and the second condition having been satisfied, acquiring a target data amount A of the production messages consumed by the cloud in a current unit time;
performing at least one of a calculating step and an acquiring step, wherein during the calculating step, the accumulation rate D is calculated according to a preset length B of the service memory queue and a data amount C of the production messages currently in the service memory queue, and wherein, during the acquiring step, a consumption time E estimated by the cloud to consume the data amount C of the production messages currently in the service memory queue is acquired according to the data amount C and the target data amount A; and pushing the production messages to the service memory queue according to the pushing amount;

determining that at least one of a third condition and a fourth condition is satisfied, wherein the third condition is determined to be satisfied if the accumulation rate D is determined to be greater than a preset accumulation rate and the fourth condition is determined to be satisfied if the consumption time E is determined to be greater than a preset consumption time;

wherein after the energy storage device pushes the production messages according to the pushing amount, the proxy server repeats operations of acquiring the production variation coefficient of the production messages pushed by the energy storage device and acquiring the consumption variation coefficient of the production messages consumed by the cloud until the first condition and the second condition are no longer satisfied, or until the at least one of the third condition and the fourth condition is no longer satisfied.

8. The method for balancing production and consumption of the energy of the energy storage device according to claim 7, wherein the exception notification message includes the target data amount A, and the determining the pushing amount of the production messages pushed by the energy storage device according to the preset mode includes:

determining the pushing amount of the production messages currently pushed by the energy storage device by a preset reduction coefficient and the target data amount A, wherein the preset reduction coefficient is a positive number less than 1.

9. The method for balancing production and consumption of the energy of the energy storage device according to claim 7, wherein after the energy storage device pushes the production messages to the service memory queue according to the pushing amount, the method further comprises:

in response to a total amount of the current production messages of the energy storage device being greater than the pushing amount, storing remaining production messages, exceeding the pushing amount in the current production messages, locally in the energy storage device.

10. The method for balancing production and consumption of the energy of the energy storage device according to claim 7, wherein the exception notification message includes the target data amount A, and the method further comprises:

in response to monitoring that the exception notification queue is not updated, acquiring the latest updated target data amount A in the exception notification queue; and pushing the production messages according to the latest updated target data amount A.

11. An electronic device, comprising:

at least one processor; and, a memory, in communication connection with the at least one processor;

wherein the memory stores instructions executable by the at least one processor, and the instructions, when executed by the at least one processor, cause the at least one processor to implement the method for balancing production and consumption of the energy of the energy storage device according to claim 1.

12. The electronic device according to claim 11, wherein the proxy server is provided with a first sliding window computing component and a rolling window computing component;

the acquiring the target data amount A of the production messages consumed by the cloud in the current unit time includes:

in response to the first condition having been satisfied, acquiring, by the rolling window computing component, the target data amount A of the production messages consumed by the cloud in the current unit time;

in response to the second condition having been satisfied, acquiring, by the first sliding window computing component, a first data amount of the production messages consumed by the cloud per unit time within a first preset time range before a current moment, and averaging a plurality of first data amounts to obtain a first average data amount, wherein the first average data amount is the target data amount A of the production messages consumed by the cloud in the current unit time.

13. The electronic device according to claim 11, wherein the proxy server is provided with a second sliding window computing component;

the acquiring the target data amount A of the production messages consumed by the cloud in the current unit time includes:

acquiring, by the second sliding window computing component, a first data amount of the production messages consumed by the cloud per unit time within a first preset time range before a current moment, and averaging a plurality of first data amounts to obtain a first average data amount, wherein the first average data amount is the target data amount A of the production messages consumed by the cloud in the current unit time.

14. The electronic device according to claim 11, wherein the acquiring the production variation coefficient of the production messages pushed by the energy storage device includes:

acquiring a second data amount of the production messages pushed by the energy storage device per unit time within a second preset time range before a current moment;

averaging a plurality of second data amounts to obtain a second average data amount;

taking variance for the plurality of second data amounts to obtain a first standard deviation; and calculating the production variation coefficient according to the second average data amount and the first standard deviation.

15. The electronic device according to claim 11, wherein the acquiring the consumption variation coefficient of the production messages consumed by the cloud includes:

acquiring a third data amount of the production messages consumed by the cloud per unit time within a third preset time range before a current moment;

averaging a plurality of third data amounts to obtain a third average data amount;

taking variance for the plurality of third data amounts to obtain a second standard deviation; and calculating the consumption variation coefficient according to the third average data amount and the second standard deviation.

16. The electronic device according to claim 11, wherein the proxy server is provided with a list of data amounts of production and consumption, configured to record the data amount of the production messages pushed by the producer per unit time and the data amount of the production messages consumed by the consumer per unit time;

the production variation coefficient and the consumption variation coefficient are acquired according to the data amount of the production messages pushed by the producer per unit time and the data amount of the production messages consumed by the consumer per unit time in the list.

17. An electronic device, comprising:
   at least one processor; and,
   a memory, in communication connection with the at least one processor;
   wherein the memory stores instructions executable by the at least one processor, and the instructions, when executed by the at least one processor, cause the at least one processor to implement the method for balancing production and consumption of the energy of the energy storage device according to claim 7.

18. The electronic device according to claim 17, wherein the exception notification message includes the target data amount A, and the determining the pushing amount of the production messages pushed by the energy storage device according to the preset mode includes:
   determining the pushing amount of the production messages currently pushed by the energy storage device by a preset reduction coefficient and the target data amount A, wherein the preset reduction coefficient is a positive number less than 1.

19. The electronic device according to claim 17, wherein after the energy storage device pushes the production messages to the service memory queue according to the pushing amount, the method further comprises:
   in response to a total amount of the current production messages of the energy storage device being greater than the pushing amount, storing remaining production messages, exceeding the pushing amount in the current production messages, locally in the energy storage device.

20. The electronic device according to claim 17, wherein the exception notification message includes the target data amount A, and the method further comprises:
   in response to monitoring that the exception notification queue is not updated, acquiring the latest updated target data amount A in the exception notification queue; and
   pushing the production messages according to the latest updated target data amount A.

* * * * *